(12) United States Patent  
Park et al.

(10) Patent No.: US 8,565,352 B2
(45) Date of Patent: Oct. 22, 2013

(54) DIGITAL IQ IMBALANCE COMPENSATION FOR DUAL-CARRIER DOUBLE CONVERSION RECEIVER

(75) Inventors: Chester Park, Santa Clara, CA (US); Niklas Andgart, Södra Sandby (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 302 days.

(21) Appl. No.: 13/045,386

(22) Filed: Mar. 10, 2011

(65) Prior Publication Data

US 2012/0230372 A1   Sep. 13, 2012

Related U.S. Application Data

(60) Provisional application No. 61/330,612, filed on May 3, 2010.

(51) Int. Cl.
 *H03D 3/00*   (2006.01)
(52) U.S. Cl.
 USPC ........... 375/322; 375/316; 375/216; 375/355; 375/271; 375/260; 375/340; 375/324; 370/203; 370/210; 370/450; 370/224; 370/455
(58) Field of Classification Search
 USPC ......... 375/322, 316, 216, 355, 271, 260, 340, 375/324; 370/203, 210, 704, 224, 455, 450
 See application file for complete search history.

(56) References Cited

U.S. PATENT DOCUMENTS

| | | |
|---|---|---|
| 6,510,317 B1 | 1/2003 | Marko et al. |
| 2005/0276354 A1* | 12/2005 | Su et al. ........................ 375/326 |
| 2010/0040178 A1* | 2/2010 | Sutton et al. .................. 375/345 |
| 2010/0054367 A1* | 3/2010 | Gorday ......................... 375/324 |
| 2011/0207418 A1* | 8/2011 | Laroia et al. .................... 455/75 |

OTHER PUBLICATIONS

Chrabieh eta al: "IQ Imbalance Mitigation via Unbiased Training Sequences", Global Telecommunications Conference, 2007. Globecom '07. IEEE, IEEE, Piscataway, NJ, USA, Nov. 1, 2007.
Johansson, K. et al. "Multi-carrier HSPA evolution." in *Proc. IEEE Vehicular Technology Conference (VTC)*, Barcelona, Spain, Jun. 2009, the whole document.
Yuan, G. et al. "Carrier aggregation for LTE-Advanced mobile communication systems," *IEEE Commun. Mag.*, vol. 48, No. 2, pp. 88-93, Feb. 2010.
Springer, A. et al. "RF system concepts for highly integrated RFICs for W-CDMA mobile radio terminals," in *IEEE Trans. Microw. Theory and Tech.*, vol. 50, No. 1, pp. 251-267, Jan. 2002.
Rudell, J.C. et al. "'A 1.9-GHz wide-band IF double conversion CMOS receiver for cordless telephone applications," in *IEEE J. of Solid-State Circuits*, vol. 32, No. 12. pp. 2071-2088, Dec. 1997.
Cho, S. et al. "Effect of phase mismatch on image rejection in Weaver architecture." in *IEEE Trans. Microw. Wireless Comp. Letters.* vol. 17, No. 1, pp. 70-72, Jan. 2007.

(Continued)

*Primary Examiner* — Zewdu Kassa

(57) ABSTRACT

Digital IQ imbalance compensation is utilized for a dual-carrier double conversion receiver. First, the effect of IQ imbalance on OFDM-based digital baseband is analyzed, showing that, in the presence of IQ imbalance, the baseband signal of each carrier is obtained from its own branch as well as the other branch. Second, IQ imbalance parameters of interest are estimated using pilot signals and compensated using only digital baseband processing.

22 Claims, 3 Drawing Sheets

(56) References Cited

OTHER PUBLICATIONS

Der, L. et al. "A 2-GHz CMOS image-reject receiver with LMS calibration," in *IEEE J. of Solid-State Circuits*. vol. 38, No. 2, Feb. 2003m the whole document.

Valkama, M. et al. "A novel image rejection architecture for quadrature radio receivers," in *IEEE Trans. Circuits Syst. II—Express Briefs*. vol. 51, No. 2. pp. 61-68, Feb. 2004.

Tarighat, A. et al. "Compensation schemes and performance analysis of IQ imbalances in OFDM receivers." in *IEEE Trans. Signal Processing*, vol. 53. No. 8, pp. 3257-3268, Aug. 2005.

Kiss, P. et al. "One-tap wideband I/Q compensation for zero-IF filters." in *IEEE Trans. Circuits Syst. I—Reg. Papers*, vol. 51. No. 6, pp. 1062-1074, Jun. 2004.

3rd Generation Partnership Project (3GPP): Technical Specification Group Radio Access Network; Evolved Universal Terrestrial Radio Access (E-UTRA): physical channels and modulation, http://www.3gpp.org/ftp/Specs/html-info/36211.htm, the whole document, Jan. 2009.

* cited by examiner

DIGITAL IQ IMBALANCE COMPENSATION FOR DUAL-CARRIER DOUBLE CONVERSION RECEIVER

RELATED APPLICATION

This application claims the benefit of U.S. Provisional Patent Application 61/330,612, entitled "Digital IQ Imbalance Compensation for Dual-Carrier Double Conversion Receiver", filed on May 3, 2010.

FIELD OF THE INVENTION

The present invention relates generally to wireless communications and in particular to a system and method for IQ imbalance measurement and compensation in a dual-carrier, double-conversion wireless receiver.

BACKGROUND

In order to achieve higher peak data rates in future wireless networks, simultaneous transmission and reception of multiple carriers, referred to as carrier aggregation, is considered as a key element. The Third Generation Partnership Project (3GPP) has been standardizing the carrier aggregation for two technologies: High Speed Packet Access (HSPA), as described in a paper by K. Johansson, J. Bergman, D. Gerstenberger, M. Blomgren and A. Wallen, titled, "Multi-carrier HSPA evolution," published in Proc. *IEEE Vehicular Technology Conference (VTC)*, Barcelona, Spain, June 2009, the disclosure of which is incorporated herein by reference in its entirety; and Long Term Evolution (LTE), as described in a paper by G. Yuan, X. Zhang, Wang and Y. Yang, titled "Carrier aggregation for LTE-Advanced mobile communication systems," published in *IEEE Commun. Mag.*, vol. 48, no. 2, pp. 88-93, February 2010, the disclosure of which is also incorporated herein by reference in its entirety. From the perspective of mobile terminals, carrier aggregation poses unprecedented design challenges, especially when multiple, non-contiguous carriers need to be transmitted and received simultaneously.

Regarding the receiver architectures of mobile terminals, a direct conversion receiver is well suited for carrier aggregation. Although direct conversion receiver has gained much popularity recently, as indicated in the book, *RF Microelectronics*, by B. Razavi, Upper Saddle River, N.J., Prentice-Hall, 1998, the disclosure of which is incorporated herein by reference in its entirety, each carrier inevitably requires an individual receiver, thereby leading to inefficient implementation. On the other hand, a wideband IF double conversion receiver is known, as described in the paper by A. Springer, L. Maurer and R. Weigel, titled "RF system concepts for highly integrated RFICs for W-CDMA mobile radio terminals," published in *IEEE Trans. Microw. Theory and Tech.*, vol. 50, no. 1, pp. 254-267, January 2002, the disclosure of which is incorporated herein by reference in its entirety. The wideband IF double conversion receiver reuses both the RF mixing stage and IF mixing stage (i.e., local oscillators, or LOs, and mixers), allowing for cost-efficient and power-efficient implementation. Moreover, it retains many of the advantages of the direction conversion receiver, for example, highly-programmable channel selection essential to aggressive carrier aggregation.

The wideband IF double conversion receiver architecture may be applied to multi-carrier reception. In, e.g., a dual-carrier double conversion receiver, one receiver branch may receive and process a first carrier, while another receiver branch receives and processes a second carrier. By selecting appropriate LO frequencies and mixer parameters, the second receiver branch may share LOs and mixers with the first branch, to conserve hardware. One drawback of such a dual-carrier double conversion receiver is the sensitivity to imbalance between the In-phase (I) and Quadrature (Q) components of a received signal (known as IQ imbalance) stemming from the shared, gain- and phase-imbalanced LOs and mixers. The problems of IQ imbalance are elucidated in papers by J. C. Rudell, J.-J Ou, T. B. Cha, G. Chien, F. Brianti, J. A. Weldon and P. R. Gray, titled, "A 1.9-GHz wide-band IF double conversion CMOS receiver for cordless telephone applications," published in *IEEE J. of Solid-State Circuits*, vol. 32, no. 12, pp. 2071-2088, December 1997, and S. Cho and H. S. Lee, titled, "Effect of phase mismatch on image rejection in Weaver architecture," published in *IEEE Trans. Microw. Wireless Comp. Letters*, vol. 17, no. 1, pp. 70-72, January 2007, the disclosures of which are incorporated herein by reference in their entireties.

Coping with IQ imbalance is an area of much research. The remedies for IQ imbalance are largely categorized into two approaches: analog calibration assisted by digital control, and digital compensation. In analog calibration, a digital circuit measures the distortion and accordingly controls the RF/analog circuit (e.g., local oscillator) in the direction that minimizes distortion. This approach is described in papers by L. Der and B. Razavi, titled "A 2-GHz CMOS image-reject receiver with LMS calibration," published in *IEEE J. of Solid-State Circuits*, vol. 38, no. 2, pp. 167-175, February 2003, and M. Valkama and M. Renfors, titled "A novel image rejection architecture for quadrature radio receivers," published in *IEEE Trans. Circuits Syst. II—Express Briefs*, vol. 51, no. 2, pp. 61-68, February 2004, the disclosures of which are incorporated herein by reference in their entireties.

On the other hand, digital compensation cancels IQ imbalance in a purely digital fashion, i.e., without controlling RF/analog components. This approach is described in papers by A. Tarighat, R. Bagheri and A. Sayed, regarding Orthogonal Frequency Division Multiplexing (OFDM) systems, titled, "Compensation schemes and performance analysis of IQ imbalances in OFDM receivers," published in *IEEE Trans. Signal Processing*, vol. 53, no. 8, pp. 3257-3268, August 2005, and Páter Kiss and V. Prodanov, titled, "One-tap wideband I/Q compensation for zero-IF filters," published in *IEEE Trans. Circuits Syst. I—Reg. Papers*, vol. 51, no. 6, pp. 1062-1074, June 2004, the disclosures of which is incorporated herein by reference in their entireties. However, digital IQ imbalance compensation has not been studied in the context of carrier aggregation.

SUMMARY

According to one or more embodiments disclosed and claimed herein, digital IQ imbalance compensation is utilized for a dual-carrier double conversion receiver. First, the effect of IQ imbalance on OFDM-based digital baseband is analyzed, showing that, in the presence of IQ imbalance, the baseband signal of each carrier is obtained from its own branch as well as the other branch. Second, IQ imbalance parameters of interest are estimated using pilot signals and compensated using only digital baseband processing.

One embodiment relates to a method of compensating for IQ imbalance of communication signals processed by a multi-carrier multiple conversion receiver operative in an RF wireless communication network, the receiver having two or more receiver chains, each operative to downconvert signals modulated onto different RF carrier frequencies to baseband via at least one IF. In a first receiver chain, a first signal modulated onto a first RF carrier is processed. In a second receiver chain that utilizes one or more RF or IF components of the first receiver chain, a second signal modulated onto a second RF carrier, different from the first carrier, is processed. The first and second signals are downconverted to baseband by conversion from the respective RF carrier frequencies to an IF, and by further conversion from the IF to baseband. Known reference signals are processed in each receiver branch. IQ imbalance estimates associated with each receiver chain are derived as the values that best match each received signal with one of the corresponding known reference signal or the corresponding known reference signal modified by the corresponding channel estimate. The received signals are compensated for the IQ imbalance based on the IQ imbalance estimates.

Another embodiment relates to a wideband IF dual-carrier double conversion receiver operative to process first and second communication signals, modulated onto first and second radio frequency (RF) carriers, respectively. The receiver includes a first receiver chain comprising RF LOs operative to perform RF mixing and RF LOs operative to perform IF mixing. The first receiver chain is operative to double convert a first signal from a first RF carrier frequency to an IF and then to baseband. The receiver also includes a second receiver chain sharing one or more RF LOs with the first receiver chain. The second receiver chains is operative to double convert a second signal from a second RF carrier frequency, different than the first RF carrier frequency, to the IF and then to baseband. The first and second receiver chains are operative to process known reference signals. The receiver further includes an IQ imbalance estimator operative to estimate IQ imbalance in each receiver chain as the values that best match each signal with one of a corresponding known reference signal or a corresponding known reference signal modified by a corresponding channel estimate. The receiver additionally includes an equalizer operative to compensate the first and second baseband signals so as remove the estimated IQ imbalance.

DETAILED DESCRIPTION

Figure 1:
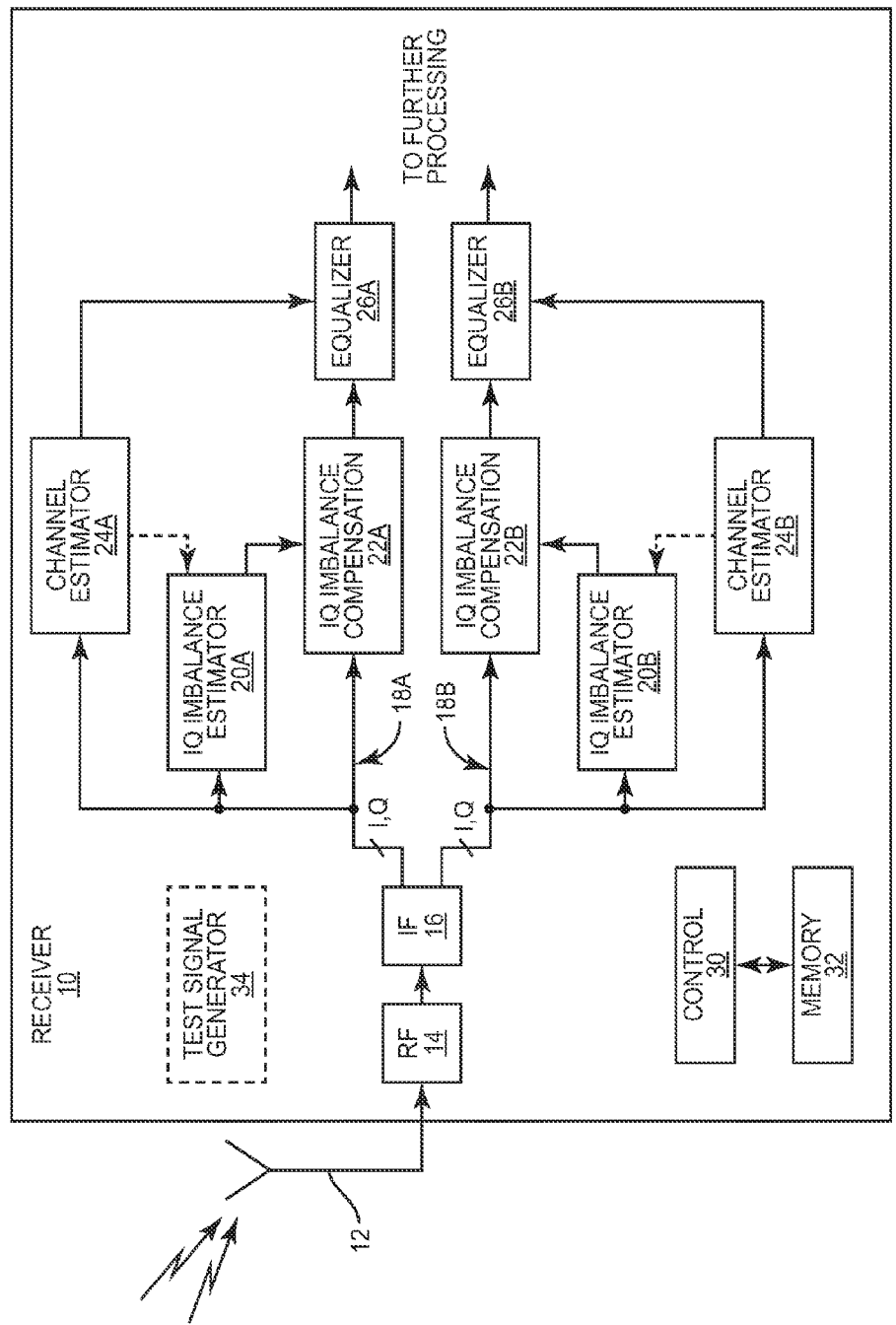
FIG. 1 is a functional block diagram of a dual-carrier double conversion receiver.

FIG. 1 depicts a dual-carrier double conversion receiver 10. The receiver 10 receives wireless communication signals modulated onto two different carriers, at one or more antenna 12. The received signals are double converted to baseband by RF LOs and mixers 14, and IF LOs and mixers 16. The IF frequency is selected such that both carrier signals share LOs and mixers 14, 16, and each carrier signal is received on a separate, parallel path 18A, 18B, each of which includes In-phase (I) and Quadrature (Q) components (as depicted in greater detail in FIG. 2). The baseband signals from receiver paths 18A, 18B are processed by an IQ imbalance estimator 20A, 20B, IQ imbalance compensator 22A, 22B, channel estimator 24A, 24B, and equalizer 26A, 26B, respectively. The IQ imbalance estimators 20A, 20B estimate the phase and amplitude imbalance between I and Q channels introduced primarily by component mismatches in RF and IF LOs and mixers 14, 16. The estimated IQ imbalance values are removed from the baseband signals 18A, 18B in IQ estimate compensators 22A, 22B, respectively.

The channel estimators 24A, 24B estimate channel coefficients during the reception of known reference signals (also known as pilot signals), as known in the art. As described in greater detail below, in one embodiment, the channel estimates are used by the IQ imbalance estimators 20A, 20B; in another embodiment, IQ imbalance estimation is performed without separate knowledge of the channel response. Equalizers 26A, 26B remove channel effects from the IQ imbalance compensated baseband signals. Outputs of the equalizers 26A, 26B are further processed as known in the art, such as to implement decoding, de-interleaving, decompression, un-encryption, and the like.

The receiver 10 operates under the control of a controller 30, such as a processor or Digital Signal Processor (DSP), operatively connected to memory 32 storing software and data. In one embodiment, a test signal generator 34 in the receiver 10 generates either RF or baseband test signals (which may comprise reference signals or test data), and injects the test signals into one or both receiver chains 18A, 18B. In various embodiments, any of the functional blocks depicted in FIG. 1 may be implemented in dedicated hardware, programmable logic and associated firmware, or as software modules executed on the controller 30 or other processing hardware, or in any combination of the above, as required or desired for a particular implementation.

The radio-frequency (RF) signal r(t) received at antenna 12 is expressed as $$r(t)=Re\{r_1(t)e^{j2\pi(f_{RF}+f_{IF})t}\}+Re\{r_2(t)e^{j2\pi(f_{RF}-f_{IF})t}\}, \quad (1)$$

where $r_1(t)$ and $r_2(t)$ are the baseband signals modulated onto carrier1 and carrier2, respectively. Note that carrier1 and carrier2 have the center frequency of $(f_{RF}+f_F)$ and $(f_{RF}-f_{IF})$, respectively. That is, the intermediate frequency is selected to be half of the difference between the first and second carrier frequencies.

Figure 2:
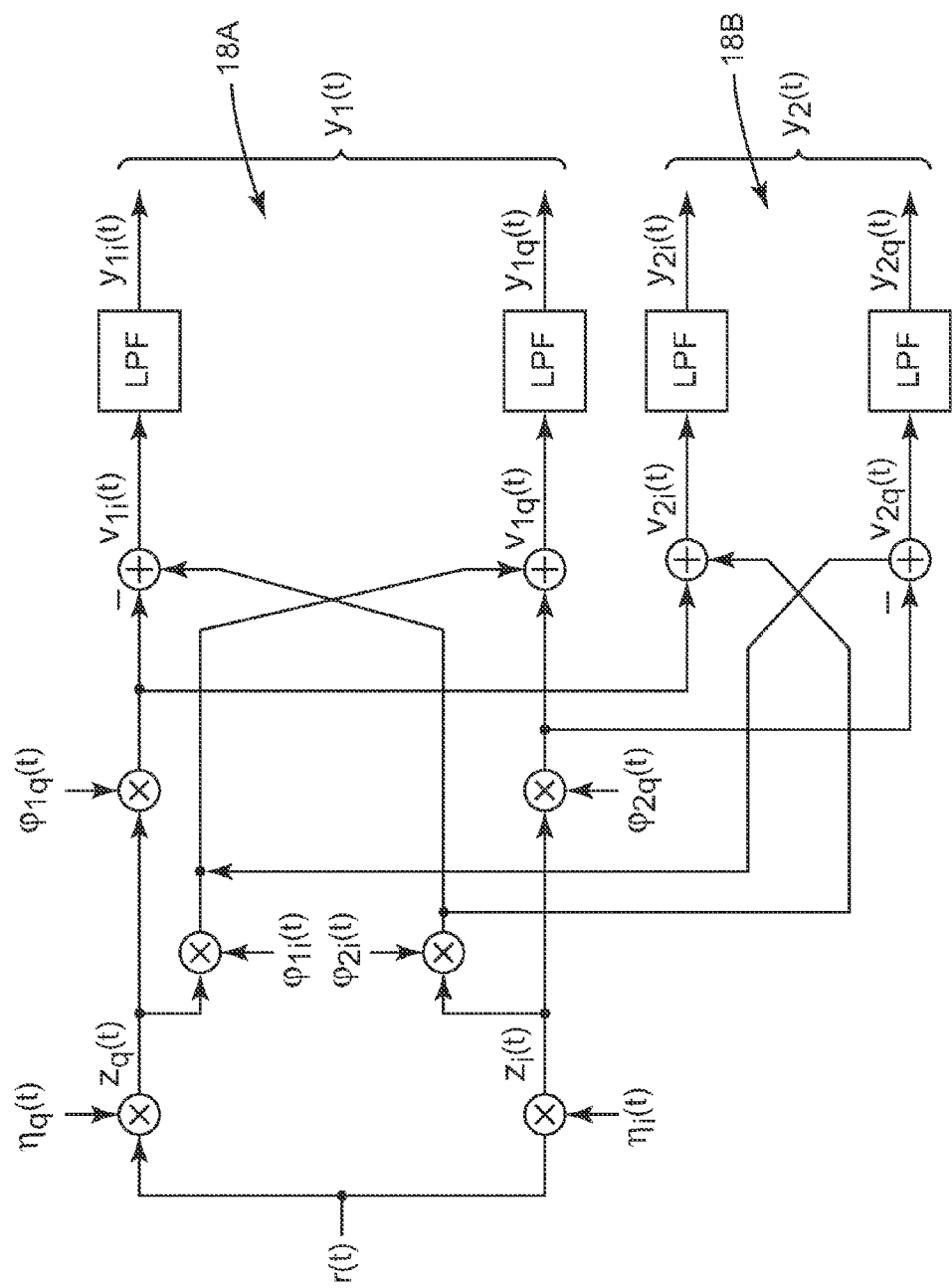
FIG. 2 is a functional schematic diagram of the RF and IF stages of the dual-carrier double conversion receiver of FIG. 1.

The frequency down-conversion of received signal r(t) in the dual-carrier double conversion receiver of FIG. 1 is depicted in greater detail in FIG. 2. The upper branch 18A receives one carrier (carrier 1) and the lower branch 18B receives the other carrier (carrier 2). As described herein, the lower branch 18B shares LOs (not shown) and mixers with the upper branch 18A. One drawback of such a dual-carrier double conversion receiver is the sensitivity to IQ imbalance stemming from the six gain- and phase-imbalanced LOs and mixers. In particular, as depicted in FIG. 2, the receiver 10 frequency-translates r(t) to baseband using two-stage mixing. The RF mixing is performed by two RF LOs, $\eta_i(t)$ and $\eta_q(t)$. The RF LO signals are given by $$\eta_i(t)=\cos(2\pi f_{RF}t),$$

$$\eta_q(t)=-g\sin(2\pi f_{RF}t+\phi), \quad (2)$$

where g and φ represent the gain imbalance and phase imbalance of RF mixing, respectively. The IF mixing is performed by four IF LOs $\phi_{1i}(t)$, $\phi_{2i}(t)$, $\phi_{1q}(t)$, $\phi_{2q}(t)$. The IF LO signals are given by $$\phi_{1i}(t)=\cos(2\pi f_{IF}t),$$

$$\phi_{1q}(t)=-h_2\sin(2\pi f_{IF}t+\theta_2),$$

$$\phi_{2i}(t)=h_3\cos(2\pi f_{IF}t+\theta_3),$$

$$\phi_{2q}(t)=h_1\sin(2\pi f_{IF}t+\theta_1), \quad (3)$$

where the gain imbalance of IF mixing is represented by $h_1$, $h_2$ and $h_3$, and the phase imbalance of IF mixing is represented by $\theta_1$, $\theta_2$ and $\theta_3$. Note that these IQ imbalance parameters represent the composite gain and phase imbalance that are introduced by the LOs as well as analog mixers, analog filters, analog amplifiers and analog-digital converters (ADC).

After RF mixing, $r(t)$ is frequency-translated to $z(t)$ as $$z(t):=z_i(t)+jz_q(t)=K_1 r(t)e^{-j2\pi f_{RF}t}+K_2 r(t)e^{j2\pi f_{RF}t} \quad (4)$$

where $K_1$ and $K_2$ are defined as $$K_1 = \frac{1}{2}(ge^{-j\phi}+1),\; K_2 = \frac{1}{2}(-ge^{j\phi}+1). \quad (5)$$

Subsequently, after IF mixing, $z(t)$ is frequency-translated to $v_1(t)$ in the upper branch 18A (i.e., the branch for carrier1). The frequency translation is given as $$v_1(t):=v_{1i}(t)+jv_{1q}(t)=\{z_i(t)h_3\cos(2\pi f_{IF}t+\theta_3)+z_q(t)h_2\sin(2\pi f_{IF}t+\theta_2)\}+j\{-z_i(t)h_1\sin(2\pi f_{IF}t+\theta_1)+z_q(t)\cos(2\pi f_{IF}t)\} \quad (6)$$

and it is re-written as $$v_1(t)=J_{1,1}z(t)e^{-j2\pi f_{IF}t}+J_{1,2}z(t)e^{j2\pi f_{IF}t}+J_{1,3}z^*(t)e^{j2\pi f_{IF}t}+J_{1,4}z^*(t)e^{-j2\pi f_{IF}t}, \quad (7)$$

where $J_{1,1}$, $J_{1,2}$, $J_{1,3}$ and $J_{1,4}$ are defined as $$J_{1,1} = \frac{1}{4}(h_3 e^{-j\theta_3}+h_2 e^{-j\theta_2}+h_1 e^{-j\theta_1}+1) \quad (8)$$

$$J_{1,2} = \frac{1}{4}(h_3 e^{j\theta_3}-h_2 e^{-j\theta_2}-h_1 e^{j\theta_1}+1)$$

$$J_{1,3} = \frac{1}{4}(h_3 e^{j\theta_3}+h_2 e^{j\theta_2}-h_1 e^{j\theta_1}-1)$$

$$J_{1,4} = \frac{1}{4}(h_3 e^{-j\theta_3}-h_2 e^{-j\theta_2}+h_1 e^{-j\theta_1}-1).$$

Combining equation (7) with equations (1) and (4), it follows that the baseband signal of carrier1, which is obtained after low-pass filtering of $v_1(t)$, is given as $$y_1(t) := y_{1i}(t)+jy_{1q}(t) \quad (9)$$
$$= P_{1,1}r_1(t)+P_{1,2}r_1^*(t)+P_{1,3}r_2(t)+P_{1,4}r_2^*(t),$$

where IQ imbalance parameters $P_{1,1}$, $P_{1,2}$, $P_{1,3}$, $P_{1,4}$ are defined as $$P_{1,1}=J_{1,1}K_1+J_{1,4}K_2^*$$

$$P_{1,2}=J_{1,2}K_2+J_{1,3}K_1^*$$

$$P_{1,3}=J_{1,2}K_1+J_{1,3}K_2^*$$

$$P_{1,4}=J_{1,1}K_2+J_{1,4}K_1^* \quad (10)$$

It is worth noting that $y_1(t)$ includes the desired signal $r_1(t)$ as well as its mirrored signal $r_1^*(t)$, the image $r_2^*(t)$, and its mirrored signal $r_2(t)$.

Likewise, $z(t)$ is frequency-translated to $v_2(t)$ in the lower branch 18B (i.e., the branch for carrier2). The frequency translation is given as $$v_2(t)=J_{2,1}z(t)e^{j2\pi f_{IF}t}+J_{2,2}z(t)e^{-j2\pi f_{IF}t}+J_{2,3}z^*(t)e^{-j2\pi f_{IF}t}+J_{2,4}z^*(t)e^{-j2\pi f_{IF}t}, \quad (11)$$

where $J_{2,1}$, $J_{2,2}$, $J_{2,3}$ and $J_{2,4}$ are defined as $$J_{2,1} = \frac{1}{4}(h_3 e^{j\theta_3}+h_2 e^{j\theta_2}+h_1 e^{j\theta_1}+1) \quad (12)$$

$$J_{2,2} = \frac{1}{4}(h_3 e^{j\theta_3}-h_2 e^{j\theta_2}-h_1 e^{j\theta_1}+1)$$

$$J_{2,3} = \frac{1}{4}(h_3 e^{-j\theta_3}+h_2 e^{-j\theta_2}-h_1 e^{-j\theta_1}-1)$$

$$J_{2,4} = \frac{1}{4}(h_3 e^{-j\theta_3}-h_2 e^{-j\theta_2}+h_1 e^{-j\theta_1}-1).$$

Also, the baseband signal of carrier2, which is obtained after low-pass filtering of $v_2(t)$, is given as $$y_2(t) := y_{2i}(t)+jy_{2q}(t) \quad (13)$$
$$= P_{2,1}r_1(t)+P_{2,2}r_1^*(t)+P_{2,3}r_2(t)+P_{2,4}r_2^*(t),$$

where IQ imbalance parameters $P_{2,1}$, $P_{2,2}$, $P_{2,3}$, $P_{2,4}$ are defined as $$P_{2,1}=J_{2,2}K_1+J_{2,3}K_2^*$$

$$P_{2,2}=J_{2,1}K_2+J_{2,4}K_1^*$$

$$P_{2,3}=J_{2,1}K_1+J_{2,4}K_2^*$$

$$P_{2,4}=J_{2,2}K_2+J_{2,3}K_1^* \quad (14)$$

It is clear from equations (9) and (13) that, in the presence of IQ imbalance, the baseband signal of each carrier is obtained from its own branch as well as the other branch. In other words, the baseband signal of carrier1, $r_1(t)$, is obtained from the upper branch 18A as well as the lower branch 18B, and vice versa.

If IF mixing is perfectly balanced, i.e., $h_1=h_2=h_3=1$ and $\theta_1=\theta_2=\theta_3=0$, or, equivalently, $J_{1,1}=J_{2,1}=1$ and $J_{1,2}=J_{1,3}=J_{1,4}=J_{2,2}=J_{2,3}=J_{2,4}=0$, then equations (9) and (13) are written as $$y_1(t)=K_1 r_1(t)+K_2 r_2^*(t),$$

$$y_2(t)=K_2 r_1^*(t)+K_1 r_2(t), \quad (15)$$

which is consistent with the analysis in Tarighat, et al., cited above.

Comparing equation (15) with equations (9) and (13), one can see that a double conversion receiver with imbalanced IF mixing tends to further degrade the signal-to-noise ratio (SNR) of a direct conversion receiver, since each carrier is interfered with additional signals—that is, both the mirrored signal and the mirrored image.

According to embodiments of the present invention, IQ imbalance in a dual-carrier double conversion receiver 10 is estimated and compensated. After analog-to-digital conversion (ADC), cyclic prefix removal and N-point fast Fourier transform (FFT), the received signals of the upper branch 12, $Y_{1,n}$ (at the n-th subcarrier, n=0, 1, L, N−1) is given as $$Y_{1,n}=P_{1,1}H_{1,n}X_{1,n}+P_{1,2}H_{1,-n}^*X_{1,-n}^*+P_{1,3}H_{2,n}X_{2,n}+P_{1,4}H_{2,-n}^*X_{2,-n}^*+W_{1,n}, \quad (16)$$

and the received signals of the lower branch 18, $Y_{2,n}$ is given as $$Y_{2,n}=P_{2,1}H_{1,n}X_{1,n}+P_{2,2}H_{1,-n}^*X_{1,-n}^*+P_{2,3}H_{2,n}X_{1,n}+P_{2,4}H_{2,-n}^*X_{2,-n}^*+W_{2,n}. \quad (17)$$

Here $H_{1,n}$, $X_{1,n}$ and $W_{1,n}$ represent the channel frequency response, transmitted signal, and additive noise of carrier1 at the n-th subcarrier, respectively. Similarly, $H_{2,n}$, $X_{2,n}$ and $W_{2,n}$ represent the channel frequency response, transmitted signal, and additive noise of carrier2 at the n-th subcarrier, respectively. Note that, in the absence of IQ imbalance, $H_{1,n}X_{1,n}$ and $H_{2,n}X_{2,n}$ are nothing but the baseband signals modulated onto carrier1 and carrier2, respectively. From equations (16) and (17), the baseline system model is obtained using vector-matrix notations as follows:

$$\begin{pmatrix} Y_{1,n} \\ Y_{1,-n}^* \\ Y_{2,n} \\ Y_{2,-n}^* \end{pmatrix} = E_n \begin{pmatrix} X_{1,n} \\ X_{1,-n}^* \\ X_{2,n} \\ X_{2,-n}^* \end{pmatrix} + \begin{pmatrix} W_{1,n} \\ W_{1,-n}^* \\ W_{2,n} \\ W_{2,-n}^* \end{pmatrix}, \quad (18)$$

where $E_n$ is referred to herein as the IQ-imbalance-plus-channel matrix, defined as $$E_n = \begin{pmatrix} P_{1,1}H_{1,n} & P_{1,2}H_{1,-n}^* & P_{1,3}H_{2,n} & P_{1,4}H_{2,-n}^* \\ P_{1,2}^*H_{1,n} & P_{1,1}^*H_{1,-n}^* & P_{1,4}^*H_{2,n} & P_{1,3}^*H_{2,-n}^* \\ P_{2,1}H_{1,n} & P_{2,2}H_{1,-n}^* & P_{2,3}H_{2,n} & P_{2,4}H_{2,-n}^* \\ P_{2,2}^*H_{1,n} & P_{2,1}^*H_{1,-n}^* & P_{2,4}^*H_{2,n} & P_{2,3}^*H_{2,-n}^* \end{pmatrix}. \quad (19)$$

The first problem is how to estimate the IQ imbalance parameters. In embodiments discussed herein, the well-known pilot-assisted estimation is chosen. Assume that $X_{1,n}$ and $X_{2,n}$ are pilot, or reference, signals of carrier1 and carrier2, respectively, and hence $X_{1,n}$ and $X_{2,n}$ are perfectly known to the receiver. The estimation problem, where $E_n$ is the parameter to estimate for the given observation $Y_{1,n}$, $Y_{1,-n}^*$, $Y_{2,n}$ and $Y_{2,-n}^*$, is under-determined, since there are fewer observations than unknowns.

To resolve this difficulty, according to a first embodiment, one may assume (in a channel exhibiting frequency-selective dispersion) that a plurality of contiguous subcarriers (e.g., four) experience identical fading. When the n-th subband is defined as the set of four contiguous subcarriers from the n-th subcarrier to (n+3)-th subcarrier, multipath fading is assumed to be frequency-flat within the n-th subband, i.e., $$H_{1,n}=H_{1,n+1}=H_{1,n+2}=H_{1,n+3}$$

$$H_{2,n}=H_{2,n+1}=H_{2,n+2}=H_{2,n+3}. \quad (20)$$

Consequently, the first row of $E_n$ is related to $Y_{1,n}$, $Y_{1,-n}^*$, $Y_{2,n}$ and $Y_{2,-n}^*$ as $$\begin{pmatrix} Y_{1,n} \\ Y_{1,n+1} \\ Y_{1,n+2} \\ Y_{1,n+3} \end{pmatrix} = X_n \begin{pmatrix} P_{1,1}H_{1,n} \\ P_{1,2}H_{1,-n}^* \\ P_{1,3}H_{2,n} \\ P_{1,4}H_{2,-n}^* \end{pmatrix}, \quad (21)$$

where $X_n$ is referred to herein as the pilot signal matrix of the n-th subband, and defined as $$X_n = \begin{pmatrix} X_{1,n} & X_{1,-n}^* & X_{2,n} & X_{2,-n}^* \\ X_{1,n+1} & X_{1,-(n+1)}^* & X_{2,n+1} & X_{2,-(n+1)}^* \\ X_{1,n+2} & X_{1,-(n+2)}^* & X_{2,n+2} & X_{2,-(n+2)}^* \\ X_{1,n+3} & X_{1,-(n+3)}^* & X_{2,n+3} & X_{2,-(n+3)}^* \end{pmatrix}. \quad (22)$$

It follows from equation (21) that the least square (LS) estimate, as discussed, for example, in the book *Fundamentals of Statistical Signal Processing—Estimation Theory* by S. Kay, Upper Saddle River, N.J., Printice-Hall, 1993, the disclosure of which is incorporated herein by reference in its entirety, is $$X_n^{-1} \begin{pmatrix} Y_{1,n} \\ Y_{1,n+1} \\ Y_{1,n+2} \\ Y_{1,n+3} \end{pmatrix}. \quad (23)$$

Note that the estimation error of $P_{1,1}H_{1,n}$, $P_{1,2}H_{1,-n}^*$, $P_{1,3}H_{2,n}$ and $P_{1,4}H_{2,-n}^*$ are proportional to the diagonal elements of $(X_n^H X_n)^{-1}$. Likewise, the second row of $E_n$ is related to $Y_{1,n}$, $Y_{1,-n}^*$, $Y_{2,n}$ and $Y_{2,-n}^*$ as $$\begin{pmatrix} Y_{1,-n}^* \\ Y_{1,-(n+1)}^* \\ Y_{1,-(n+2)}^* \\ Y_{1,-(n+3)}^* \end{pmatrix} = X_n \begin{pmatrix} P_{1,2}H_{1,n} \\ P_{1,1}^*H_{1,-n}^* \\ P_{1,4}H_{2,n} \\ P_{1,3}^*H_{2,-n}^* \end{pmatrix}, \quad (24)$$

and the LS estimate is $$\begin{pmatrix} P_{1,2}^*H_{1,n} \\ P_{1,1}H_{1,-n}^* \\ P_{1,4}^*H_{2,n} \\ P_{1,3}H_{2,-n}^* \end{pmatrix} = X_n^{-1} \begin{pmatrix} Y_{1,-n}^* \\ Y_{1,-(n+1)}^* \\ Y_{1,-(n+2)}^* \\ Y_{1,-(n+3)}^* \end{pmatrix} \quad (25)$$

and vice versa. Since the pilot matrix $X_n$ is common to all the rows of $E_n$, the estimation error of the n-th column of $E_n$ is proportional to the n-th diagonal element of $(X_n^H X_n)^{-1}$.

Once the IQ-imbalance-plus-channel-matrix of the n-th subband, $E_n$, is estimated, the second problem is how to compensate for IQ imbalance. Since $E_n$ includes time-variant channel parameters ($H_{1,n}$, $H_{1,-n}^*$, $H_{2,n}$, $H_{2,-n}^*$) as well as time-invariant (or, relatively less time-variant) IQ Imbalance parameters ($P_{1,1}$, $P_{1,2}$, $P_{1,3}$, $P_{1,4}$, $P_{2,1}$, $P_{2,2}$, $P_{2,3}$, $P_{2,4}$), it is considered time-invariant. Therefore, the separation of channel from IQ Imbalance is needed so that the estimate obtained from pilot signal is used to compensate for IQ imbalance during the subsequent data reception. Note that equation (18) can be re-written as $$\begin{pmatrix} Y_{1,n} \\ Y_{1,-n}^* \\ Y_{2,n} \\ Y_{2,-n}^* \end{pmatrix} = F \begin{pmatrix} P_{1,1}H_{1,n}X_{1,n} \\ P_{1,1}^*H_{1,-n}^*X_{1,-n}^* \\ P_{2,3}H_{2,n}X_{2,n} \\ P_{2,3}^*H_{2,-n}^*X_{2,-n}^* \end{pmatrix} + \begin{pmatrix} W_{1,n} \\ W_{1,-n}^* \\ W_{2,n} \\ W_{2,-n}^* \end{pmatrix}, \quad (33)$$

where F is referred to herein as an IQ-imbalance matrix, and is defined as $$F = \begin{pmatrix} 1 & \frac{P_{1,2}}{P_{1,1}^*} & \frac{P_{1,3}}{P_{2,3}} & \frac{P_{1,4}}{P_{2,3}^*} \\ \frac{P_{1,2}^*}{P_{1,1}} & 1 & \frac{P_{1,4}^*}{P_{2,3}} & \frac{P_{1,3}^*}{P_{2,3}^*} \\ \frac{P_{2,1}}{P_{1,1}} & \frac{P_{2,2}}{P_{1,1}^*} & 1 & \frac{P_{2,4}}{P_{2,3}^*} \\ \frac{P_{2,2}^*}{P_{1,1}} & \frac{P_{2,1}^*}{P_{1,1}^*} & \frac{P_{2,4}^*}{P_{2,3}} & 1 \end{pmatrix}. \quad (34)$$

Interestingly, F is time-invariant (assuming time-invariant IQ imbalance; actually the IQ imbalance varies with, e.g., temperature change in analog components, and hence varies slowly enough to be considered time-invariant). Also, F becomes available to the receiver 10, since it is a normalized version of $E_n$, e.g., in one embodiment, an IQ-imbalance matrix whose columns are normalized by the diagonal elements. In another embodiment, the IQ-imbalance matrix may be normalized by other (i.e., non-diagonal) elements of each column. As an example, IQ imbalance compensation is again performed using least square (LS) estimation. From equation (34), the LS estimate is $$F_n^{-1} \begin{pmatrix} Y_{1,n} \\ Y_{1,-n}^* \\ Y_{2,n} \\ Y_{2,-n}^* \end{pmatrix}, \quad (35)$$

Therefore, IQ imbalance compensation according to embodiments of the present invention provides $P_{1,1}H_{1,n}X_{1,n}$ and $P_{2,3}H_{2,n}X_{2,n}$ that are the desired baseband signals of carrier1 and carrier2, respectively, except additional gains $P_{1,1}$ and $P_{2,3}$. Since these gains are considered as part of channel, conventional channel estimation and equalization are still applicable afterwards.

According to a second embodiment, it is possible to separate channel estimation from IQ imbalance estimation. In detail, by extending equations (21) and (22) to N contiguous subcarriers, it follows that $$Y_1 = GP_1 \quad (26)$$

where $$Y_1 = \begin{pmatrix} Y_{1,n} \\ Y_{1,n+1} \\ M \\ Y_{1,n+(N-1)} \end{pmatrix}, P_1 = \begin{pmatrix} P_{1,1} \\ P_{1,2} \\ P_{1,3} \\ P_{1,4} \end{pmatrix}, \quad (27)$$

and G is defined as $$G = \begin{pmatrix} H_{1,n}X_{1,n} & H_{1,-n}^* X_{1,-n}^* & H_{2,n}X_{2,n} & H_{2,-n}^* X_{2,-n}^* \\ H_{1,n+1}X_{1,n+1} & H_{1,-(n+1)}^* X_{1,-(n+1)}^* & H_{2,n+1}X_{2,n+1} & H_{2,-(n+1)}^* X_{2,-(n+1)}^* \\ M & M & M & M \\ H_{1,n+(N-1)}X_{1,n+(N-1)} & H_{1,-(n+(N-1))}^* X_{1,-(n+(N-1))}^* & H_{2,n+(N-1)}X_{2,n+(N-1)} & H_{2,-(n+(N-1))}^* X_{2,-(n+(N-1))}^* \end{pmatrix}. \quad (28)$$

Assume that $H_{1,n}$, $H_{1,-n}^*$, $H_{2,n}$, $H_{2,-n}^*$ are already estimated by the channel estimator 20 in the receiver 10. Then the IQ imbalance estimateion is expressed as finding each element in $P_1$ that best matches equation (26). This is done for each element i=1K 4 as $$\hat{P}_{1,i} = \underset{P_{1,i}}{\operatorname{argmin}} (Y_1 - GP_1)^H (Y_1 - GP_1). \quad (29)$$

This is done by differentiating the expression in equation (29) by $P_{1,i}^*$ and setting the derivative to zero. This leads to a 4×4 equation system that gives the IQ imbalance estimates:

$$\begin{pmatrix} G_{:,1}^H G_{:,1} & G_{:,1}^H G_{:,2} & G_{:,1}^H G_{:,3} & G_{:,1}^H G_{:,4} \\ G_{:,2}^H G_{:,1} & G_{:,2}^H G_{:,2} & G_{:,2}^H G_{:,3} & G_{:,2}^H G_{:,4} \\ G_{:,3}^H G_{:,1} & G_{:,3}^H G_{:,2} & G_{:,3}^H G_{:,3} & G_{:,3}^H G_{:,4} \\ G_{:,4}^H G_{:,1} & G_{:,4}^H G_{:,2} & G_{:,4}^H G_{:,3} & G_{:,4}^H G_{:,4} \end{pmatrix} \begin{pmatrix} P_{1,1} \\ P_{1,2} \\ P_{1,3} \\ P_{1,4} \end{pmatrix} = \begin{pmatrix} G_{:,1}^H Y_1 \\ G_{:,2}^H Y_1 \\ G_{:,3}^H Y_1 \\ G_{:,4}^H Y_1 \end{pmatrix}, \quad (30)$$

or, equivalently, $$G^H G P_1 = Y_1, \quad (31)$$

with the solution $$\hat{P}_1 = (G^H G)^{-1} G^H Y_1. \quad (32)$$

Similar operations are repeated to get the estimates for the second branch. It is also possible to assume that $P_{1,1}=1$ in the above expression, and let the channel estimation take care of the scaling. This will result in a smaller 3×3 equation system.

One advantage of this method is that it can be applied over a wide frequency range, and during a long time period, in order to improve the estimation accuracy. Unlike the method described in the first embodiment, the channel is not assumed to be constant during the whole measurement. Additionally, when the data set is increased (i.e., measuring over more resource elements in time or frequency), this will only require new MACS, since the equation system is only solved once per branch 18A, 18B at the end. For compensation, the same algorithm as in equations (34) and (35) below can be used, with or without the normalization with the denominator values in (34).

Compensation for IQ imbalance in this case is similar to that described above with respect to the first embodiment. However, it can be simpler, since the IQ imbalance is estimated separately from channel coefficient. Note that equation (18) can be re-written as $$\begin{pmatrix} Y_{1,n} \\ Y^*_{1,-n} \\ Y_{2,n} \\ Y^*_{2,-n} \end{pmatrix} = P \begin{pmatrix} H_{1,n}X_{1,n} \\ H^*_{1,-n}X^*_{1,-n} \\ H_{2,n}X_{2,n} \\ H^*_{2,-n}X^*_{2,-n} \end{pmatrix} + \begin{pmatrix} W_{1,n} \\ W^*_{1,-n} \\ W_{2,n} \\ W^*_{2,-n} \end{pmatrix}, \quad (36)$$

where P is referred to herein as an IQ-imbalance matrix, and is defined as $$P = \begin{pmatrix} P_{1,1} & P_{1,2} & P_{1,3} & P_{1,4} \\ P^*_{1,2} & P^*_{1,1} & P^*_{1,4} & P^*_{1,3} \\ P_{2,1} & P_{2,2} & P_{2,3} & P_{2,4} \\ P^*_{2,2} & P^*_{2,1} & P^*_{2,4} & P^*_{2,3} \end{pmatrix} \quad (37)$$

Comparing P in (37) with F in (34), F is a normalized version of P (as well as $E_n$), i.e., each column of F is a normalized version of the corresponding column of P by the diagonal element. Therefore, likewise, P is time-invariant and it becomes available to the receiver 10. As an example, IQ imbalance compensation is again performed using least square (LS) estimation. From equation (36), the LS estimate is $$P^{-1} \begin{pmatrix} Y_{1,n} \\ Y^*_{1,-n} \\ Y_{2,n} \\ Y^*_{2,-n} \end{pmatrix} \quad (38)$$

In this case, IQ imbalance compensation provides $H_{1,n}X_{1,n}$ and $H_{2,n}X_{2,n}$ that are the desired baseband signals of carrier1 and carrier2, respectively. As a result, conventional channel estimation and equalization are applicable afterwards. Note that the additional gains $P_{1,1}$ and $P_{2,3}$ mentioned above with respect to the first embodiment are not to be considered in the second embodiment, since the IQ imbalance estimate is separately obtained from channel coefficient estimate.

This algorithm may be extended in a number of ways. First, to handle frequency selective IQ imbalance, the bandwidth can be divided into a number of segments (selected by n and N in the previous formulas), where the IQ imbalance is estimated independently. Second, the algorithms presented in co-pending patent application P25516-PCT/EP2009/054183, filed on Apr. 8, 2009, and assigned to the assignee of the present application, the disclosure of which is incorporated herein by reference in its entirety, may be used to handle the case in LTE without pilots placed on mirror subcarriers. Third, the algorithms presented in co-pending patent application P26052-PCT/EP2008/058383, filed on Jun. 30, 2008, and assigned to the assignee of the present application, the disclosure of which is incorporated herein by reference in its entirety, may be used to handle frequency offset compensation combined with IQ imbalance compensation. Finally, the order in which the estimation and compensation are done can be varied. For example, compensation can be done first, with the estimation afterwards in a feedback fashion. This may be particularly advantageous when compensation is performed in analog circuitry and estimation in the digital baseband.

Figure 3:
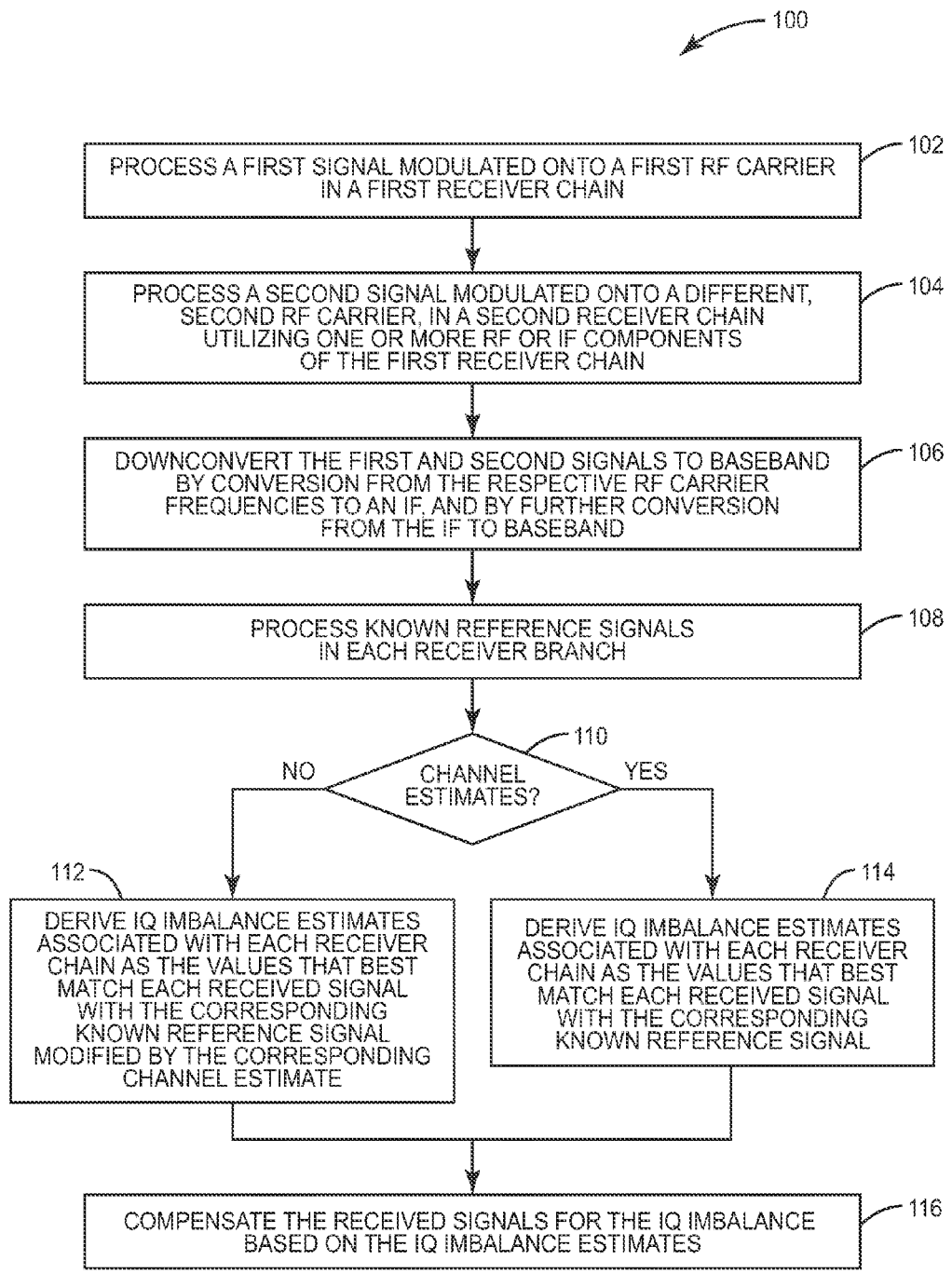
FIG. 3 is a flow diagram of a method of IQ imbalance compensation in the dual-carrier double conversion receiver of FIG. 1.

FIG. 3 depicts a method 100 of compensating for IQ imbalances between two or more signals. A first signal, modulated onto a first RF carrier, is processed in a first receiver chain (block 102). A second signal, modulated onto a second RF carrier that is a different frequency from the first carrier, is processed in a second receiver chain that utilizes one or more RF or IF components of the first receiver chain (block 104). The first and second signals are downconverted to baseband by conversion from the respective RF carrier frequencies to an IF, and by further conversion from the IF to baseband (block 106). Known reference signals—i.e., pilot signals—are processed in each receiver branch (block 108).

In one embodiment, where channel estimates are not available (block 110), IQ imbalance estimates associated with each receiver chain are derived as the values that best match each received signal with the corresponding known reference signal modified by the corresponding channel estimate (block 112). This is expressed mathematically at equations (18) and (19), with respect to the IQ-imbalance-plus-channel matrix E. In another embodiment, where channel estimates are generated prior to IQ imbalance estimation (block 110), IQ imbalance estimates associated with each receiver chain are derived as the values that best match each received signal with the corresponding known reference signal (block 114). This is expressed mathematically at equations (26)-(28), where the channel estimates H are known. In either case, the received signals are compensated the for the IQ imbalance based on the IQ imbalance estimates (block 116).

The inventive estimation and compensation methods may be extended to the case where the pilot signal is available over multiple contiguous subcarriers. Since the IQ imbalance estimate tends to be perturbed by additive noise, it is always advantageous, in terms of estimation error, to estimate the IQ imbalance parameters from as many subbands as possible. For example, if the pilot signal exists over N contiguous subcarriers, up to (N−3) subbands can be used to estimate the IQ imbalance parameters. However, recalling that the estimation error of IQ imbalance matrix of the n-th subband is given by $(X_n^H X_n)^{-1}$, it is of primary importance to combine the estimates from multiple subbands in favor of less erroneous estimates.

In one embodiment, a linear combination whose weights are inversely proportional to the estimation error of $E_n$ is used to obtain the effective IQ imbalance estimate. In detail, the k-th column of the n-th subband estimate of F is weighted by the inverse of the k-th diagonal element of $(X_n^H X_n)^{-1}$ and all the k-th columns of N−3 subband estimates (n=0, 1, L, N−2) are summed together. The remaining processing, including compensation, is the same as described above.

Although the reception of pilot signals is assumed, the inventive IQ imbalance estimation and compensation methods are also applicable to the case where a test signal is inserted into RF/analog components, e.g., at the input of the RX mixing stage.

Embodiments of the present invention present numerous advantages over prior art methods of IQ imbalance estimation and compensation for multiple-carrier double conversion receivers. The IQ imbalance introduced by both RF mixing and IF mixing may be compensated, resulting in improved receiver performance. Arbitrarily high IQ imbalance estimation accuracy may be achieved by increasing the amount of pilot/test signal. Since IQ imbalance is compensated using digital baseband processing alone, and does not require the control of RF/analog components, it is generally applicable to existing radio chips as an add-on chip and without changing the chip-to-chip interface. In embodiments of the invention, estimation and compensation are performed in digital baseband, and hence these operations generally consumes lower power and it are more robust against chip-to-chip variation that analog techniques. Embodiments of the invention relax the requirement on IQ imbalance, reducing design time and eliminating the need for calibration. The invention is applicable to both pilot-signal-assisted compensation and test-signal-assisted compensation. Finally, embodiments of the invention can be combined with any existing analog calibration methods, since digital compensation and analog calibration are complementary.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of compensating for imbalances between the In-phase (I) and Quadrature (Q) components (IQ imbalance) of communication signals processed by a multi-carrier multiple conversion receiver operative in a radio frequency (RF) wireless communication network, the receiver having two or more receiver chains, each operative to downconvert signals modulated onto different RF carrier frequencies to baseband via at least one intermediate frequency (IF), the method comprising:
  processing, in a first receiver chain, a first signal modulated onto a first RF carrier;
  processing, in a second receiver chain that utilizes one or more RF or IF components of the first receiver chain, a second signal modulated onto a second RF carrier, different from the first carrier;
  downconverting the first and second signals to baseband by conversion from the respective RF carrier frequencies to an IF, and by further conversion from the IF to baseband;
  processing known reference signals in each receiver branch;
  deriving IQ imbalance estimates associated with each receiver chain as the values that best match each received signal with one of the corresponding known reference signal or the corresponding known reference signal modified by the corresponding channel estimate;
  wherein deriving IQ imbalance estimates associated with each receiver chain as the values that best match each received signal with the corresponding known reference signal further comprises:
    estimating an IQ-imbalance-plus-channel matrix comprising IQ imbalance values scaled by channel estimates; and
    normalizing the IQ-imbalance-plus-channel matrix to remove the channel estimates; and
  compensating the received signals for the IQ imbalance based on the IQ imbalance estimates.

2. The method of claim 1, further comprising:
  compensating the received signals for the IQ imbalance based on the IQ imbalance estimates; and
  performing equalization on the compensated received signals to remove both residual IQ imbalance gain factors and channel frequency response.

3. The method of claim 1 wherein the first and second signals are Orthogonal Frequency Division Multiplexed (OFDM) signals and wherein estimating an IQ-imbalance-plus-channel matrix comprises
  selecting a plurality of contiguous subcarriers;
  assuming multipath fading is constant over the selected subcarriers; and
  estimating the IQ-imbalance-plus-channel matrix jointly over the selected subcarriers.

4. The method of claim 1 further comprising:
  estimating the channel frequency response associated with each carrier, prior to deriving the IQ imbalance estimates associated with each receiver chain as the values that best match each received signal with the corresponding known reference signal modified by the corresponding channel estimate.

5. The method of claim 4 wherein deriving the IQ imbalance estimates associated with each receiver chain comprises expressing the received signals as IQ imbalance scaling factors multiplied by known reference signal values as modified by the corresponding channel estimates, and solving for the IQ imbalance scaling factors.

6. The method of claim 1 wherein the intermediate frequency is half of the difference between the first and second carrier frequencies.

7. The method of claim 1 wherein at least one of the first and second signals comprises a test signal generated in the multi-carrier multiple conversion receiver and injected into a receiver chain.

8. The method of claim 7 wherein the test signal comprises a baseband signal.

9. A method of compensating for imbalances between the In-phase (I) and Quadrature (Q) components (IQ imbalance) of communication signals processed by a multi-carrier multiple conversion receiver operative in a radio frequency (RF) wireless communication network, the receiver having two or more receiver chains, each operative to downconvert signals modulated onto different RF carrier frequencies to baseband via at least one intermediate frequency (IF), the method comprising:
  processing, in a first receiver chain, a first signal modulated onto a first RF carrier;
  processing, in a second receiver chain that utilizes one or more RF or IF components of the first receiver chain, a second signal modulated onto a second RF carrier, different from the first carrier;
  downconverting the first and second signals to baseband by conversion from the respective RF carrier frequencies to an IF, and by further conversion from the IF to baseband:
  processing known reference signals in each receiver branch;
  deriving IQ imbalance estimates associated with each receiver chain as the values that best match each received signal with one of the corresponding known reference signal or the corresponding known reference signal modified by the corresponding channel estimate;
  wherein the first and second signals are Orthogonal Frequency Division Multiplexed (OFDM) signals and wherein deriving the IQ imbalance associated with each receiver chain further comprises:
    deriving IQ imbalance estimates over a plurality of subcarriers having different pilot patterns; and
    combining the IQ imbalance estimates for different subcarriers based on the pilot patterns; and
  compensating the received signals for the IQ imbalance based on the IQ imbalance estimates.

10. The method of claim 9 wherein combining the IQ imbalance estimates for different subcarriers based on the pilot patterns comprises combining the IQ imbalance estimates for different subcarriers such that the IQ imbalance estimates are emphasized for those subcarriers having pilot patterns conducive to accurate IQ imbalance estimation.

11. The method of claim 10 wherein combining the IQ imbalance estimates for different subcarriers based on the pilot patterns comprises forming a weighted linear average of IQ imbalance estimates for different subcarriers, wherein the weights depend on the pilot pattern for the respective subcarriers.

12. A wideband intermediate frequency (IF) dual-carrier double conversion receiver operative to process first and second communication signals, modulated onto first and second radio frequency (RF) carriers, respectively, comprising:
   a first receiver chain comprising RF local oscillators (LO) operative to perform RF mixing and RF LOs operative to perform IF mixing, the first receiver chain operative to double convert a first signal from a first RF carrier frequency to an IF and then to baseband;
   a second receiver chain sharing one or more RF LOs with the first receiver chain and operative to double convert a second signal from a second RF carrier frequency, different than the first RF carrier frequency, to the IF and then to baseband;
   wherein the first and second receiver chains are operative to process known reference signals;
   an IQ imbalance estimator operative to estimate IQ imbalance in each receiver chain as the values that best match each signal with one of a corresponding known reference signal or a corresponding known reference signal modified by a corresponding channel estimate; and
   an equalizer operative to compensate the first and second baseband signals so as remove the estimated IQ imbalance, wherein the IQ imbalance estimator is operative to estimate IQ imbalance by:
   estimating an IQ-imbalance-plus-channel matrix comprising IQ imbalance values scaled by channel estimates; and
   normalizing the IQ-imbalance-plus-channel matrix to remove the channel estimates.

13. The receiver of claim 12 wherein
   the IQ imbalance estimator is further operative to estimate IQ imbalance by compensating the received signals for the IQ imbalance using a least square estimation; and
   the equalizer is operative to compensate the first and second baseband signals by performing equalization on the compensated received signals to remove residual IQ imbalance gain factors.

14. The receiver of claim 13 wherein the first and second signals are Orthogonal Frequency Division Multiplexed (OFDM) signals and wherein the IQ imbalance estimator is operative to estimate an IQ-imbalance-plus-channel matrix by:
   selecting a plurality of contiguous subcarriers;
   assuming multipath fading is constant over the selected subcarriers; and
   estimating the IQ-imbalance-plus-channel matrix jointly over the selected subcarriers.

15. The receiver of claim 12 wherein the IQ imbalance estimator is operative to estimate IQ imbalance by estimating the channel frequency response associated with each carrier, prior to estimating the IQ imbalance in each receiver chain as the values that best match each received signal with a corresponding known reference signal.

16. The receiver of claim 15 wherein estimating the IQ imbalance in each receiver chain comprises expressing the received signals as IQ imbalance scaling factors multiplied by known reference signal values as modified by the corresponding channel estimates, and solving for the IQ imbalance scaling factors.

17. The receiver of claim 12 wherein the intermediate frequency is half of the difference between the first and second carrier frequencies.

18. The receiver of claim 12 further comprising a test signal generator operative to generate and inject a test signal into at least one of the first and second receiver chains.

19. The receiver of claim 18 wherein the test signal generator is operative to generate a baseband frequency test signal.

20. A wideband intermediate frequency (IF) dual-carrier double conversion receiver operative to process first and second communication signals, modulated onto first and second radio frequency (RF) carriers, respectively, comprising:
   a first receiver chain comprising RF local oscillators (LO) operative to perform RF mixing and RF LOs operative to perform IF mixing, the first receiver chain operative to double convert a first signal from a first RF carrier frequency to an IF and then to baseband;
   a second receiver chain sharing one or more RF LOs with the first receiver chain and operative to double convert a second signal from a second RF carrier frequency, different than the first RF carrier frequency, to the IF and then to baseband;
   wherein the first and second receiver chains are operative to process known reference signals;
   an IQ imbalance estimator operative to estimate IQ imbalance in each receiver chain as the values that best match each signal with one of a corresponding known reference signal or a corresponding known reference signal modified by a corresponding channel estimate; and
   an equalizer operative to compensate the first and second baseband signals so as remove the estimated IQ imbalance, wherein the first and second signals are Orthogonal Frequency Division Multiplexed (OFDM) signals and wherein the IQ imbalance estimator is operative to:
   derive IQ imbalance estimates over a plurality of subcarriers having different pilot patterns; and
   combine the IQ imbalance estimates for different subcarriers based on the pilot patterns.

21. The receiver of claim 20 wherein combining the IQ imbalance estimates for different subcarriers based on the pilot patterns comprises combining the IQ imbalance estimates for different subcarriers such that the IQ imbalance estimates are emphasized for those subcarriers having pilot patterns conducive to accurate IQ imbalance estimation.

22. The receiver of claim 21 wherein combining the IQ imbalance estimates for different subcarriers based on the pilot patterns comprises forming a weighted linear average of IQ imbalance estimates for different subcarriers, wherein the weights depend on the pilot pattern for the respective subcarriers.

* * * * *

UNITED STATES PATENT AND TRADEMARK OFFICE
CERTIFICATE OF CORRECTION

PATENT NO.         : 8,565,352 B2
APPLICATION NO.    : 13/045386
DATED              : October 22, 2013
INVENTOR(S)        : Park et al.

It is certified that error appears in the above-identified patent and that said Letters Patent is hereby corrected as shown below:

In the Specification

In Column 5, Line 12, in Equation (4), after " $z(t):=z_i(t)+jz_q(t)=K_1r(t)e^{-j2\pi f_{RF}t}+K_2r(t)e^{j2\pi f_{RF}t}$ " insert -- , --, therefor.

In Column 5, Lines 24-26, in Equation (6), after " $v_1(t):=v_{1i}(t)+jv_{1q}(t)=\{z_i(t)h_3\cos(2\pi f_{IF}t+\theta_3)+z_q(t)h_2\sin(2\pi f_{IF}t+\theta_2)\}+j\{-z_i(t)h_1\sin(2\pi f_{IF}t+\theta_1)+z_q(t)\cos(2\pi f_{IF}t)\}$ " insert -- , --, therefor.

In Column 6, Lines 5-6, in Equation (11), delete " $v_2(t)=J_{2,1}z(t)e^{j2\pi f_{IF}t}+J_{2,2}z(t)e^{-j2\pi f_{IF}t}+J_{2,3}z^*(t)e^{-j2\pi f_{IF}t}+J_{2,4}z^*(t)e^{-j2\pi f_{IF}t}$ , " and insert --
$$v_2(t) = J_{2,1}z(t)e^{j2\pi f_{IF}t} + J_{2,2}z(t)e^{-j2\pi f_{IF}t} + J_{2,3}z^*(t)e^{-j2\pi f_{IF}t} + J_{2,4}z^*(t)e^{j2\pi f_{IF}t},$$
--, therefor.

In Column 8, Line 12, delete "Printice-Hall," and insert -- Prentice-Hall, --, therefor.

In Column 10, Line 3, delete "estimateion" and insert -- estimation --, therefor.

In Column 10, Line 46, delete "MACS," and insert -- MACs, --, therefor.

In Column 11, Line 18, delete "Fin" and insert -- F in --, therefor.

In Column 12, Line 15, delete "matrix E." and insert -- matrix En. --, therefor.

Signed and Sealed this
Twenty-second Day of April, 2014

Michelle K. Lee
*Deputy Director of the United States Patent and Trademark Office*

CERTIFICATE OF CORRECTION (continued)
U.S. Pat. No. 8,565,352 B2

In the Claims

In Column 13, Line 62, in Claim 3, delete "comprises" and insert -- comprises: --, therefor.

In Column 14, Line 41, in Claim 9, delete "baseband:" and insert -- baseband; --, therefor.